United States Patent
Kiyota et al.

(10) Patent No.: US 7,291,024 B2
(45) Date of Patent: Nov. 6, 2007

(54) ELECTRIC DISTRIBUTION BOX

(75) Inventors: Hirotaka Kiyota, Ogasa-gun (JP);
Hiroaki Kamo, Ogasa-gun (JP);
Yoshihiko Nakahama, Toyota (JP);
Kazuhiro Kusuyama, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/963,738

(22) Filed: Oct. 14, 2004

(65) Prior Publication Data
US 2005/0130460 A1   Jun. 16, 2005

(30) Foreign Application Priority Data
Oct. 14, 2003  (JP)  ............... P2003-353340

(51) Int. Cl.
*H01R 12/00*  (2006.01)
(52) U.S. Cl. ........................ 439/76.2; 439/34
(58) Field of Classification Search ................. 439/34, 439/76.2, 76.1, 475; 174/52; 361/752
See application file for complete search history.

(56) References Cited

U.S. PATENT DOCUMENTS

| | | | | |
|---|---|---|---|---|
| 2,888,836 A | * | 6/1959 | Felts | ........................ 74/493 |
| 5,251,910 A | * | 10/1993 | Lamanna | ..................... 273/442 |
| 6,019,682 A | * | 2/2000 | Arabo | ......................... 463/52 |
| 6,085,598 A | * | 7/2000 | Baba et al. | ................... 73/756 |
| 6,728,110 B2 | * | 4/2004 | Koyama | ..................... 361/752 |
| 6,796,802 B2 | * | 9/2004 | Iwata | .......................... 439/34 |
| 2002/0061677 A1 | | 5/2002 | Iwata | |

FOREIGN PATENT DOCUMENTS

| JP | 6-31327 A | 4/1994 |
|---|---|---|
| JP | 2002-159116 A | 5/2002 |
| JP | 2003-95036 A | 4/2003 |

\* cited by examiner

*Primary Examiner*—Alexander Gilman
(74) *Attorney, Agent, or Firm*—Sughrue Mion, PLLC

(57) ABSTRACT

An electric distribution box, includes a box body for being placed in a vehicle room; a mounting portion which is provided on the box body for being fixed to a vehicle body, and a rupture induction portion which is provided at a box body side of the mounting portion for inducing the rupture of the mounting portion by an impact upon collision of a vehicle so as to separate the box body from the vehicle body. The mounting portion is divided into two virtual sections by a line passing through a center of an insertion hole of the mounting portion, the longitudinal axis being substantially parallel to an advance direction of the vehicle. The rupture induction portion is provided at one of the two virtual sections which is disposed in a direction away from a direction of laterally-inclining of the box body upon collision of the vehicle.

5 Claims, 8 Drawing Sheets

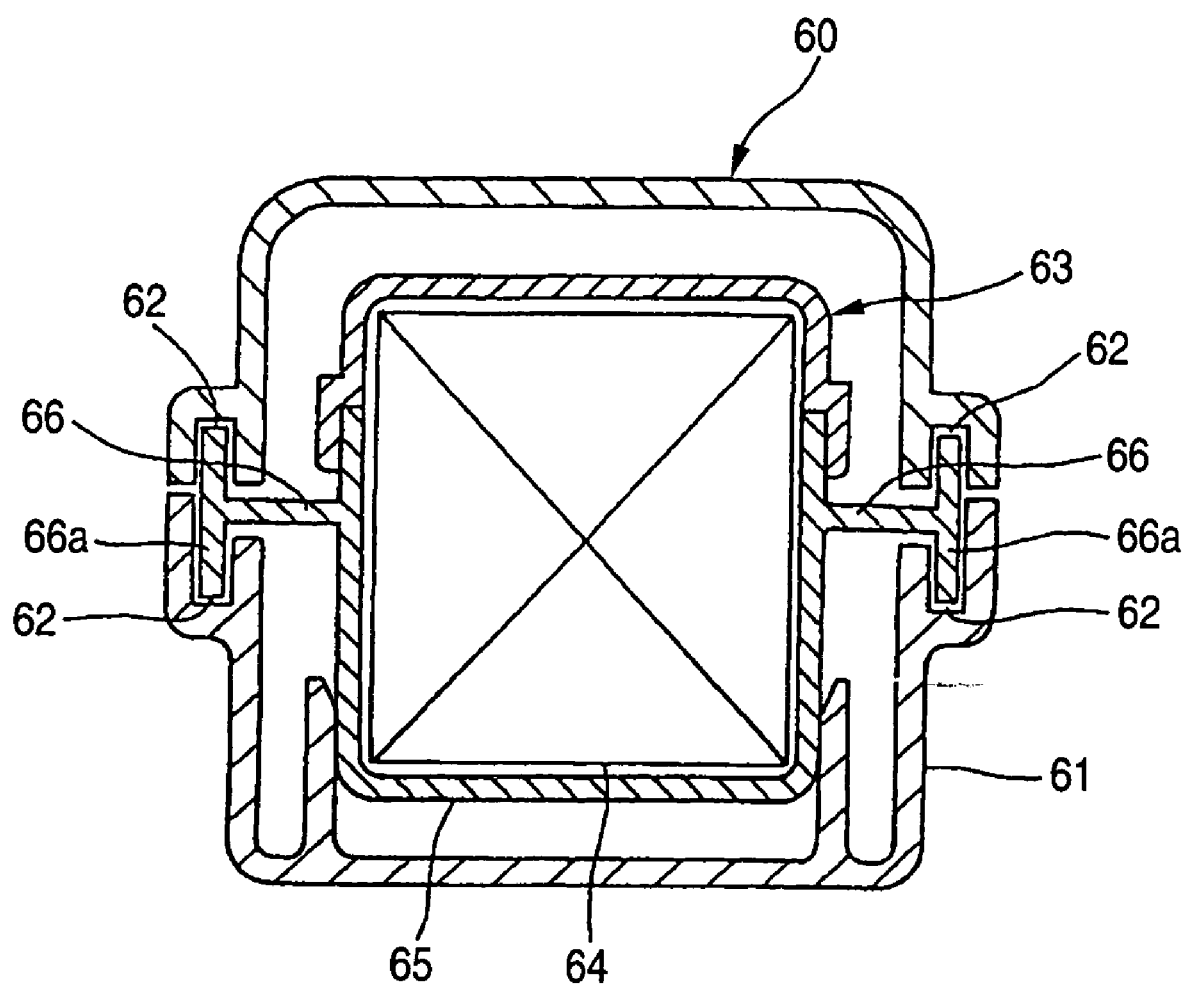

ELECTRIC DISTRIBUTION BOX

BACKGROUND OF THE INVENTION

This invention relates to an electric distribution box which contains an ECU (Electric Control Unit), and is mounted within an engine room of an automobile.

FIGS. 7 and 8 show related electric distribution boxes, respectively (see JP-A-2002-159116 (Pages 2 to 4, FIG. 2) and JP-A-2003-95036 (Pages 2 to 4, FIG. 2), for example). The electric distribution box (JP-A-2002-159116) 50, shown in FIG. 7, is an automotive electric distribution box for supplying electric power to door lock devices and others, and this electric distribution box 50 is designed such that at the time of collision of the vehicle, damage to the electric distribution box 50 is kept to a minimum so as to protect an internal circuit so that the supply of electric power to the loads can be maintained as much as possible. A projecting portion 52 for preferentially receiving an impact upon collision of the vehicle is provided at a box body 51 which is mounted on a cowl side panel (not shown) disposed rearwardly of an instrument panel. Also, mounting brackets 53 for being preferentially broken by an impact upon collision of the vehicle are provided at the box body 51.

The electric distribution box 50 comprises the box body 51, and various electronic parts (not shown) and so on contained in the box body 51. The box body 51 is resin-molded into a rectangular shape, and a parts-receiving chamber for receiving the various electronic parts and so on is formed within the box body 51. The projecting portion 52 projects from a side wall of the box body 51 in a direction to receive an impact upon collision of the vehicle. Vertical ribs 52a for reinforcing purposes which extend in a direction parallel to the impact-receiving direction, as well as horizontal ribs 52b for reinforcing purposes which perpendicularly intersect the vertical ribs 52a, are formed at the inner side of the projecting portion 52, and the stiffness of the projecting portion 52 is increased by these ribs.

The pair of mounting brackets 53 are provided respectively at corner portions of the side wall of the box body 51 in opposed relation to each other in a diagonal direction. Each of these mounting brackets 53 includes an arm 54 extending from the side wall, and a mounting portion 55 extending from the arm 54. Each arm 54 is reinforced by ribs 54a, but is disposed in intersecting relation to the impact receiving direction, and therefore is adapted to be broken prior to the breaking of the electric distribution upon collision of the vehicle. The mounting portion 55 has a screw hole 55 formed therethrough at a center thereof, and also has radial ribs formed around the screw hole 55 at equal intervals. Screws are passed respectively through the screw holes 55, and are tightened, thereby fixing the box body 51 to the cowl side panel (not shown).

The related example (JP-A-2003-95036), shown in FIG. 8, is the electric distribution box 60 which contains an ECU, and is designed to prevent the ECU from being broken upon collision of the vehicle, thereby enhancing a safety. In this electric distribution box 60, the ECU 63 (which is higher in rigidity than a box body 61) is mounted in this box body 61 (fixedly mounted within an engine room) through mounting portions 66, and the mounting portions 66 are provided in a projecting manner so that the ECU 63 can be disengaged from the box body 61 by an impact upon collision of the vehicle.

The electric distribution box 60 comprises the box body 61 made of a synthetic resin, and the ECU 63 contained in the box body 61. The box body 61 is fixed in a space, for example, between a headlamp and a suspension tower within the engine room. Engagement grooves 62 are formed in a side wall of the box body 61, and flanges 66a, formed respectively at distal ends of the mounting portions 66 of an outer casing 65, are retainingly engaged in the engagement grooves 62, respectively.

The ECU 63 includes an ECU body 64 contained in the outer casing 65 made of aluminum. The mounting portions 66 for mounting on the box body 61 are formed on and project from opposite side surfaces of the outer casing 65, respectively. The flange 66a, serving as a retaining portion, is formed at the distal end of each mounting portion 66. When the mounting portions 66 receive an impact upon collision of the vehicle, the mounting portions 66 are broken prior to the breaking of the electric distribution box 60. As a result, the ECU 63 is disengaged from the box body 61, and escapes into an unoccupied space, and therefore the ECU body 64 will not be broken even when the box body 61 is broken, thereby maintaining the minimum electrical function.

Other related example is disclosed in JP-UM-A-6-31327 (Pages 4 to 6). This related example relates to an electric distribution box mounted inside an instrument panel, and is designed such that the electric distribution box will not project into a vehicle room at the time of collision of the vehicle. A support cancellation portion for positively canceling support upon reception of an impact at the time of collision of the vehicle is provided at at least one of mounting brackets formed respectively at front and rear sides of the electric distribution box. The electric distribution box whose support has been canceled drops downward, so that the electric distribution box is prevented from breaking through the instrument panel into the vehicle room.

However, the above related electric distribution boxes 50 and 60 have the following problems to be solved. In the first related example, when the arms 54 are broken by an impact upon collision of the vehicle, the electric distribution box 50 escapes in a predetermined direction, so that the electric distribution box 50 is prevented from being crushed. However, the direction of escape of the electric distribution box is not limited, and therefore there was a fear that the electric distribution box 50 was crushed together with the vehicle body when the electric distribution box escaped in some direction.

In the second related example, the ECU 63 of high rigidity is contained in the box body 61, and when the mounting brackets 66 are broken upon collision of the vehicle, the ECU 63 can be disengaged from the box body 61. In this case, also, there was a fear that the ECU 63 was crushed together with the vehicle body when the EUC 63 escaped in some direction as is the case with the above related example. And besides, the ECU 63 is supported in a floating condition by the mounting portions 66, and therefore the stability of the ECU was bad, and there was a fear that the ECU vibrated during the travel of the vehicle.

In the third related example, the electric distribution box whose support has been canceled drops downward, so that the electric distribution box is prevented from breaking through the instrument panel into the vehicle room. However, the direction of movement of the electric distribution box after this dropping movement is not limited, and therefore as is the case with the first and second related examples, there was a fear that the electric distribution box was crushed when the electric distribution box moved (or escaped). in some direction.

SUMMARY OF THE INVENTION

In view of the foregoing, it is an object of this invention to provide an electric distribution box in which a box body, receiving an impact upon collision of a vehicle, is allowed to escape in a predetermined direction so that the box body can protected against breaking (that is, prevented from being crushed) without adversely affecting a crushability performance of the vehicle, thereby maintaining the function of an electric system necessary for safety purposes.

In order to achieve the above object, according to the present invention, there is provided an electric distribution box, comprising:

a box body for being placed in a vehicle room;

a mounting portion, which is provided on the box body for being fixed to a vehicle body, and having an insertion hole; and a rupture induction portion, which is provided at a box body side of the mounting portion for inducing the rupture of the mounting portion by an impact upon collision of a vehicle so as to separate the box body from the vehicle body, wherein the mounting portion is divided into two virtual sections by a line passing through a center of the insertion hole of the mounting portion, the longitudinal axis being substantially parallel to an advance direction of the vehicle; and wherein the rupture induction portion is provided at one of the two virtual sections which is disposed in a direction away from a direction of laterally-inclining of the box body upon collision of the vehicle.

In the above construction, the electric distribution box is fixed to the vehicle body through the mounting portion having the rupture induction portion, and therefore when the automobile collides with a vehicle, running in the opposite direction, or other, an impact force, produced by the collision, acts on the rupture induction portion in a concentrating manner, thereby inducing the rupture of the rupture induction portion, and the mounting portion is ruptured and separated to be disengaged from a fastening member or the like, so that the box body can move. For example, in an automobile of the high collision-safety type in which upon collision of the vehicle, an engine room is crushed to absorb a collision impact so as to protect the passengers in the passenger room, even when the box body is fixed to the vehicle body, with its longitudinal axis extending generally in the direction of advance of the vehicle, because of limited unoccupied spaces within the vehicle room, the box body is inclined laterally to move into an unoccupied space adjacent to an engine upon collision of the vehicle, and even if the engine room is crushed, the box body is prevented from being crushed.

Preferably, the rupture induction portion is a hole portion formed on the mounting portion.

In the above construction, stresses due to a collision impact are liable to concentrate on a peripheral edge portion of the hole portion, and also a section performance of the mounting portion is lowered, so that the rupture of the mounting portion is more liable to be induced at the hole portion.

Preferably, the box body has a front wall, rear wall and a side wall regarding to the advance direction of the vehicle. The mounting portion is provided at the rear wall. An auxiliary mounting portion is provided at a front wall side of the side wall. An elongated hole for fixing purposes is formed on the auxiliary mounting portion so as to extend substantially along a line interconnecting the center of the mounting portion and a center of the auxiliary mounting portion.

In the above construction, the auxiliary mounting portion is provided at the box body, and therefore the lateral movement of the box body during the travel of the vehicle is limited, and the box body is fixed without shaking both in the longitudinal and transverse (lateral) directions. Upon collision of the vehicle, the box body is allowed to be displaced in the direction of the long axis of the elongated hole in the auxiliary mounting portion by an impact.

Preferably the electric distribution box further includes an interference portion, which is provided on the box body, and the interference portion having a convexly-curved surface for allowing the box body to escape in a direction away from an automotive part when the box body is disengaged from the vehicle body by an impact upon collision of a vehicle and interfered with the automotive part.

Preferably, the interference portion includes ribs arranged in a mesh pattern.

In the above constructions, the mounting portion is ruptured upon collision of the vehicle, and thereafter the interference portion strikes against the automotive part or the vehicle body portion, and the box body moves in the direction away from the automotive part or the vehicle body portion.

According to the present invention, there is also provided an electric distribution box, comprising:

a box body, for being placed on a vehicle room, being disengaged from a vehicle body by an impact upon collision of a vehicle, and interfering with an automotive part in the vehicle; and an interference portion, which is provided on the box body, and the interference portion having a convexly-curved surface for allowing the box body to escape in a direction away from the automotive part upon interference of the interference portion with the automotive part in the vehicle room.

In the above construction, the interference portion strikes against a distal end portion of the automotive part or a vehicle body portion upon collision of the vehicle, and the box body receives a reaction force from the automotive part or the vehicle body portion through the convexly-curved surface, and moves in the direction away from the automotive part or the vehicle body portion.

Preferably, the interference portion includes ribs arranged in a mesh pattern.

In the above construction, the strength of the interference portion increases, and when the interference portions strikes hard against the automotive part or the vehicle body portion upon collision of the vehicle, the interference portion is prevented from being broken.

BRIEF DESCRIPTION OF THE DRAWINGS

The above objects and advantages of the present invention will become more apparent by describing in detail preferred exemplary embodiments thereof with reference to the accompanying drawings, wherein:

FIG. 8 is a cross-sectional view of another related electric distribution box.

DETAILED DESCRIPTION OF THE PREFERRED EMBODIMENTS

Figure 1:
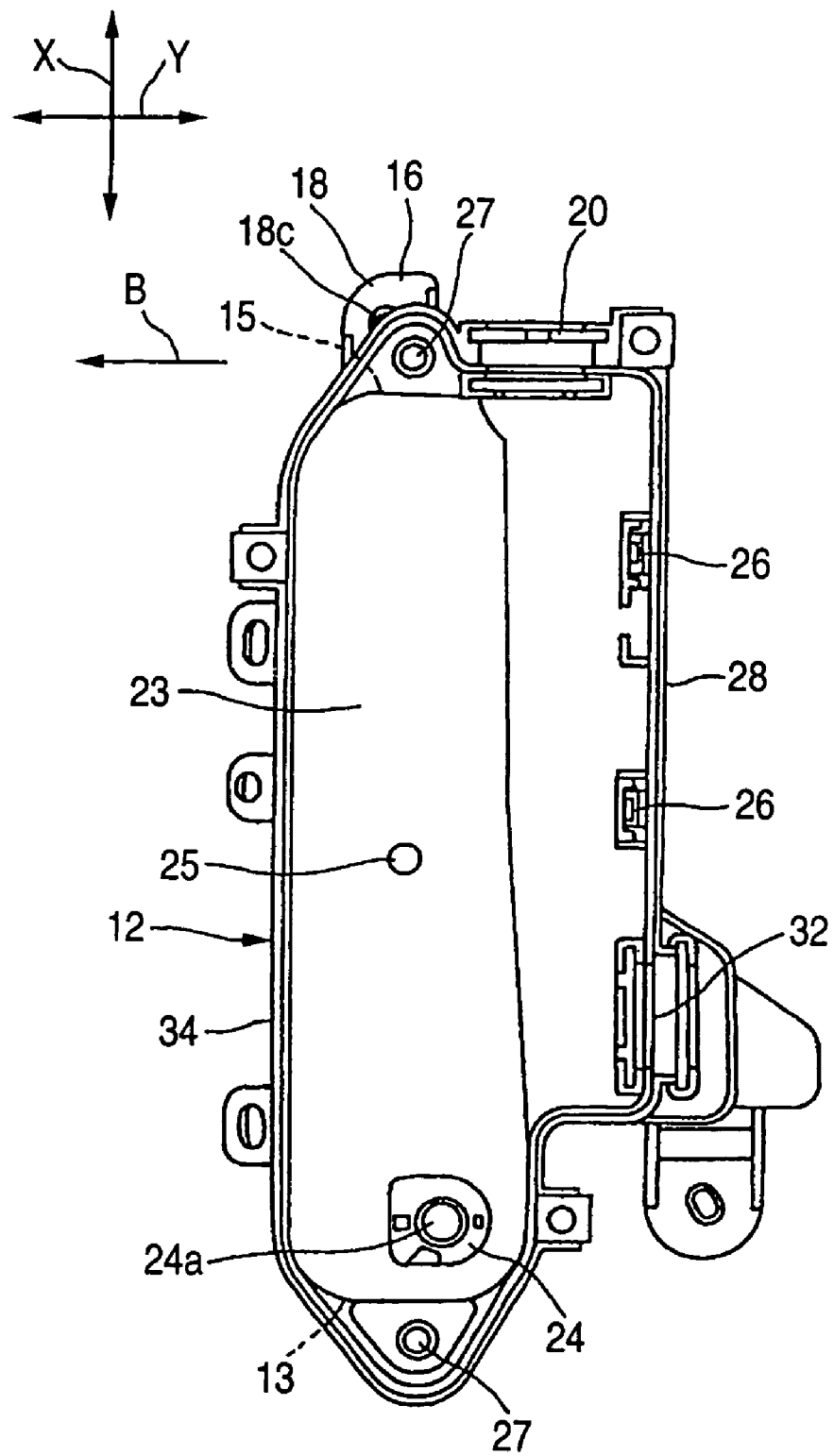
FIG. 1 is a plan view showing a lower cover of an ECU box (electric distribution box) forming one preferred embodiment of the invention.
Figure 2:
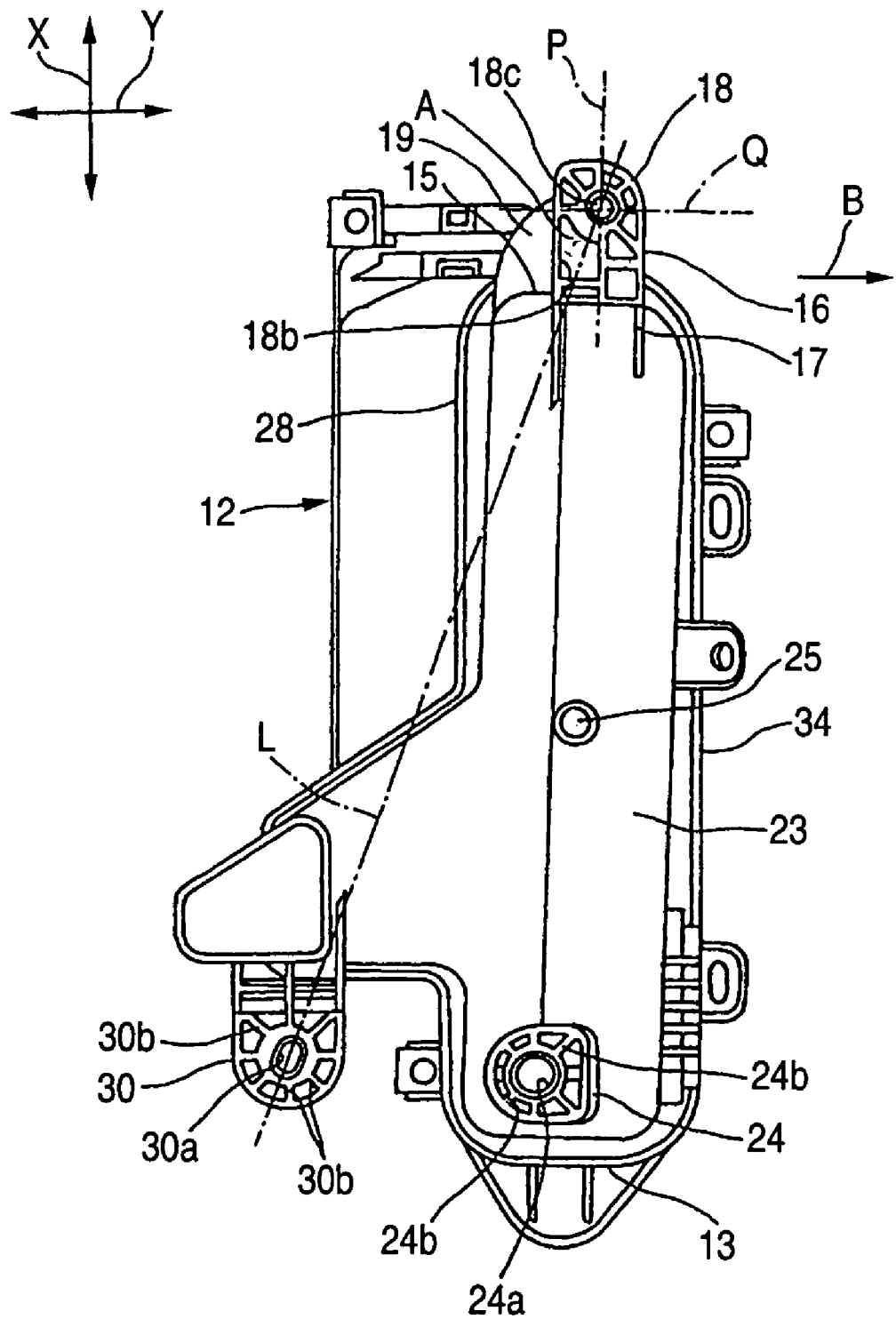
FIG. 2 is a bottom view of the lower cover of FIG. 1.

A preferred embodiment of the present invention will now be described in detail with reference to the drawings. FIGS. 1 and 2 show a lower cover 12 of an ECU box forming one preferred embodiment of an electric distribution box of the invention.

The ECU box is a control unit which is located between a battery 43 (FIG. 6) and an electrical equipment (not shown), and is supplied with electric power from the battery 43 to control electrical equipments (such as actuators and meters) in accordance with electrical signals. This ECU box is an automotive part which is fixed to a vehicle body panel (vehicle body), a tire case, an instrument panel or other portion of an engine room 37 of an automobile or the like, using fastening elements such as fastening bolts and screws.

Figure 6:
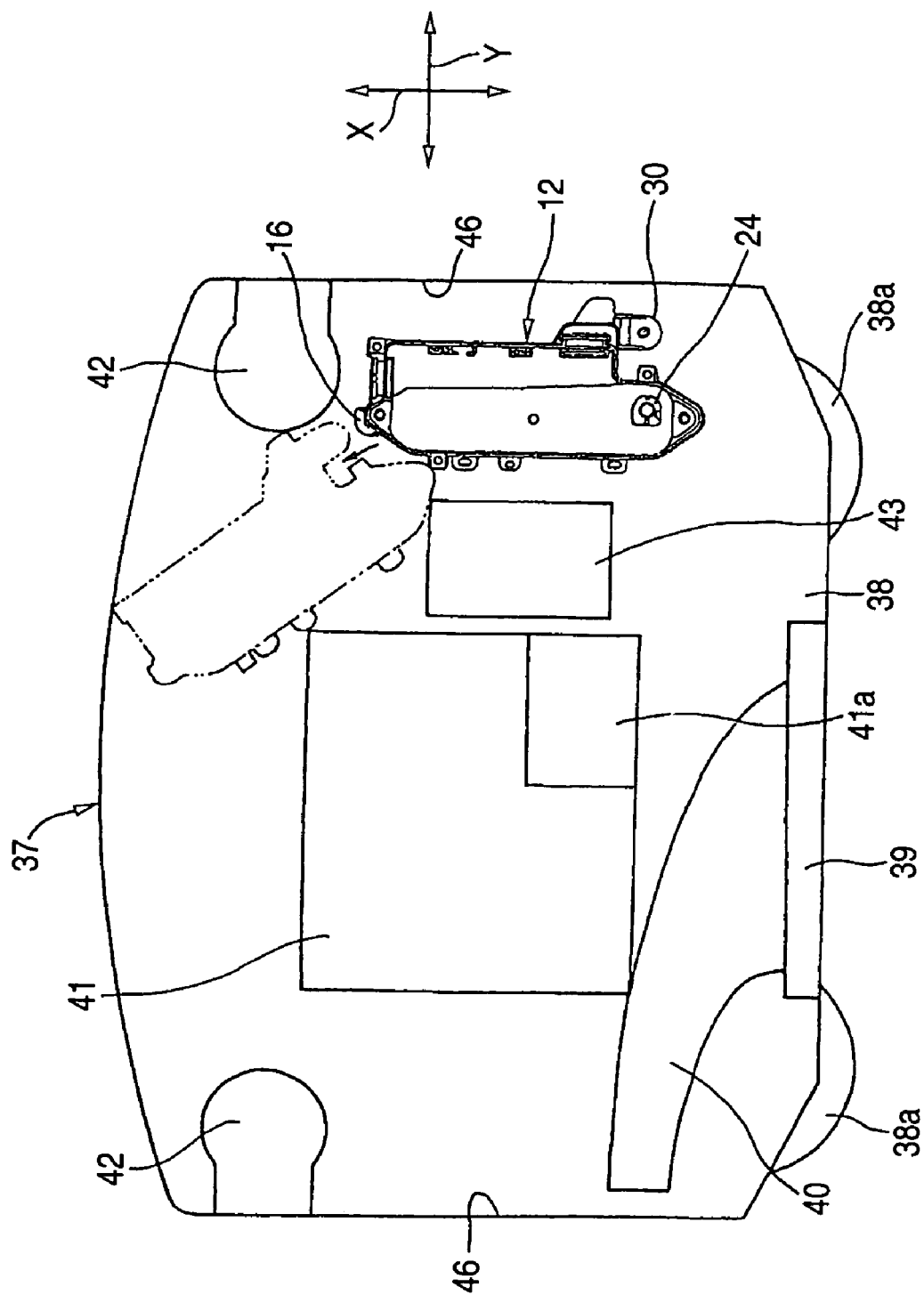
FIG. 6 is a plan view showing an engine room of an automobile in which the lower cover is mounted.
Figure 7:
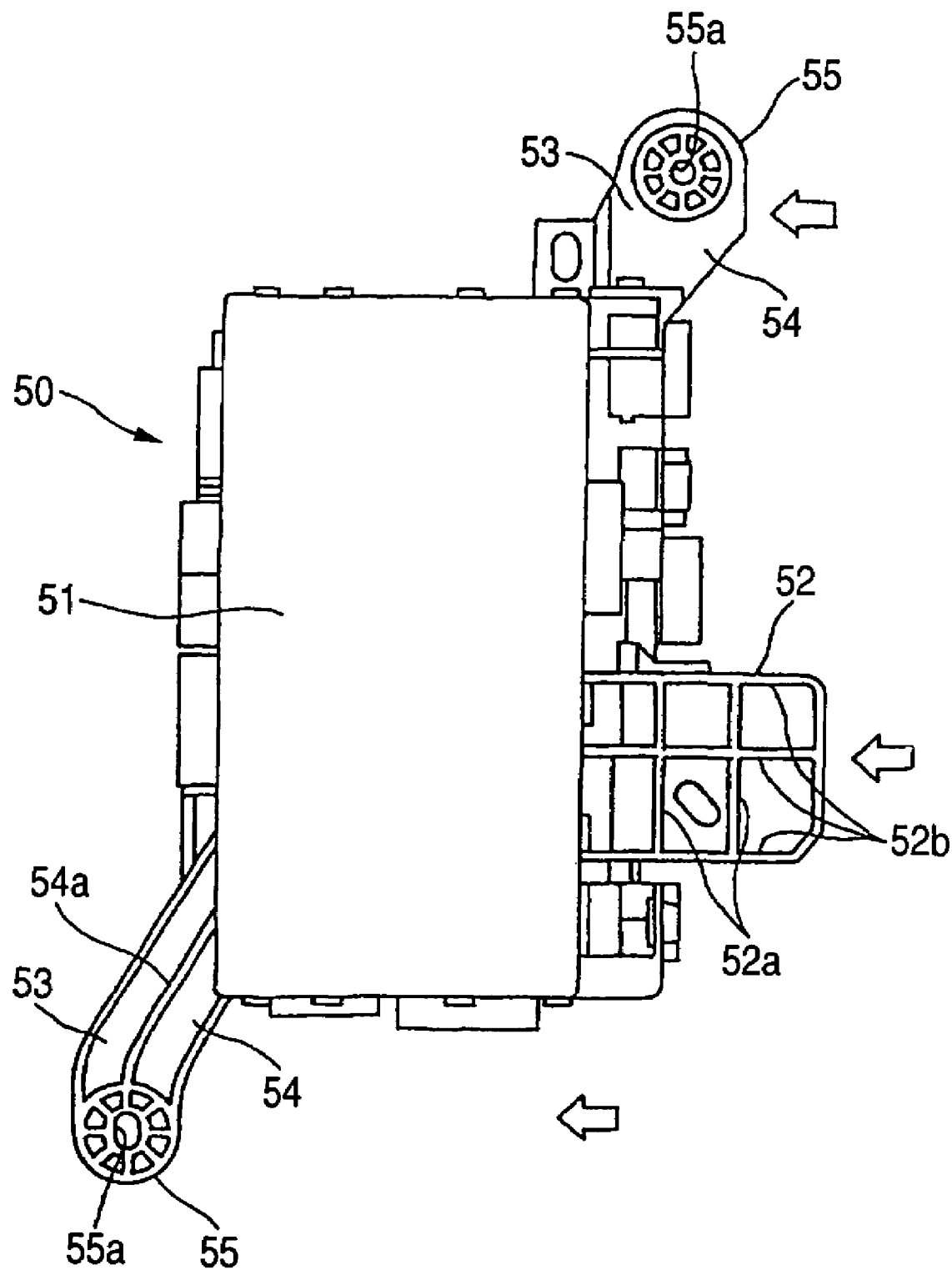
FIG. 7 is a front-elevational view of a related electric distribution box.

As shown in FIG. 6, the ECU box (lower cover 12) of this embodiment is fixed in a narrow space (within the engine room 37) between a headlamp 38a and a suspension tower (vehicle body) 42 through first to third mounting brackets (vehicle body-mounting portion and auxiliary mounting portion) 16, 24 and 30 (formed on the lower cover 12 of a box body) in such a manner that a longitudinal axis of this ECU box is disposed in a direction of advance of the vehicle. An ECU (not shown) is received within the box body, and is protected from interference with the exterior and also from dust, dirt and others. The ECU enables the various electrical equipments (mounted on the instrument panel), door locks, door mirrors, door windows, various lamps and so on to perform their respective functions.

The engine room 37 is a rectangular box-like space, and its upper side, having an opening, is closed by a hood. Referring to the interior of the engine room 37, an engine 41 is located at a central portion of the engine room, and a radiator 39 and an intake manifold 40, connected to the radiator 39, are disposed forwardly of the engine 41 in the direction of advance of the vehicle. Suspension towers 42 are laterally provided respectively at fender aprons 46 (disposed respectively at the opposite sides of the engine room), and are disposed rearwardly of the engine 41 in the direction of advance of the vehicle. The battery 43 is provided adjacent to one side of the engine 41, and the headlamps 38a are provided at opposite sides of a front mask 38, respectively. An unoccupied space for the escape of the ECU box thereinto exists at the rear side of the engine 41.

The ECU box of this embodiment is provided with the mounting bracket 16 which will not be broken during the travel of the vehicle, but is broken at the time of collision of the vehicle. When the box body receives an impact upon collision of the vehicle, the box body is allowed to escape from a space between the headlamp 38a and the suspension tower 42 to move into the unoccupied space at the rear side of the engine 41. By doing so, the ECU within the box body is protected from damage, and is prevented from being crushed without adversely affecting a crushability performance of the automobile, thereby maintaining the minimum function of an electric system necessary for safety purposes.

The first mounting bracket 16 for being fixed to the vehicle body panel of the engine room 37 is provided at the lower cover 12 of the box body, and a hole portion (rupture induction portion) 18b for inducing the rupture of the first mounting bracket 16 upon collision of the vehicle is formed in a proximal end portion of the first mounting bracket 16. In this ECU box, the first mounting bracket 16 is ruptured and separated from the vehicle body panel, with the hole portion 18b serving as the origin of the rupture. With respect to a first feature of this ECU box, the box body is located between the headlamp 38a and the suspension tower 42 (which are opposed to each other, and are disposed respectively at front and rear portions of the engine room 37 which is crushed at the time of collision of the vehicle) in such a manner that the longitudinal axis of this box body is disposed in the direction of advance of the vehicle, and assuming that a region where the first mounting bracket 16 is provided is divided into two sections (regions) by a longitudinal axis P (FIG. 2) passing through a center of an insertion hole of the first mounting bracket 16 and disposed parallel to the direction of advance of the vehicle, the hole portion 18b is provided at one (section A) of the two sections which is disposed in a direction away from the direction of lateral movement of the box body at the time of collision of the vehicle. With respect to a second feature of this ECU box, the first mounting bracket 16 is formed at a rear wall 15 of the box body (lower cover 12) disposed forwardly of the suspension tower 42, and the third mounting bracket 30 is formed on and projects laterally from a side wall 28 opposed to the fender apron 46, and is disposed near to a front wall 13 of the box body, and a slot 30a for screw-fastening purposes is formed through the third mounting bracket 30 in such a manner that a long axis of this slot 30a extends along a straight line L (FIG. 2) interconnecting the center of the first mounting bracket 16 and the center of the third mounting bracket 30.

The ECU box of this embodiment is so designed that when the ECU box strikes against the suspension tower 42 at the time of head-on collision of the automobile with a vehicle, running in the opposite direction, or other, the ECU box can move away from the suspension tower 42 to escape into the unoccupied space provided at the rear side of the engine 41. Within the engine room 37, the ECU box is located forwardly of the suspension tower 42 in adjacent relation thereto, and the box body is disengaged from the vehicle body panel by an impact upon collision of the vehicle, and strikes against a distal end portion of the suspension tower 42. A third feature of this ECU box is that an interference portion 19 of a mesh-like (grid-like) rib structure, having a convexly-curved surface, is provided at the rear wall 15 of the box body which can strike against the suspension tower 42. Incidentally, there are occasions when the box body is located between the headlamp 38a and some automotive part, or is located between front and rear automotive parts within the narrow engine room, and in such a case the box body may strike against the rear automotive part at the time of collision of the vehicle.

The main constituent portions of the ECU box, as well as their operations, will be described below in detail. The first and second features of this embodiment will be described mainly with reference to FIGS. 1 to 3, and the third feature of this embodiment will be described with reference to FIGS. 4 and 5, using FIG. 6 and other Figures according to the need.

In the present specification, for description purposes, the forward-backward direction X, the right-left direction Y and the upper-lower direction Z will be defined as follows. The forward-backward direction X is the direction of advance of the vehicle or the direction of the length of the lower cover 12. "The front side" is that side where the second mounting bracket 24 is disposed, and "the rear side" is that side where the first mounting bracket 16 is disposed. The right-left direction Y is the direction of the width of the automobile or the direction of the width of the lower cover 12. "The left side" is that side where the third mounting bracket 30 is disposed, and "the right side" is that side which is opposite relative to that side where the third mounting bracket 30 is disposed. The upper-lower direction Z is the direction of height of the automobile or the direction of height of the lower cover 12. "The upper side" is that side where an opening in the lower cover 12 is disposed, and "the lower side" is that side where a bottom wall 23 (FIG. 4) is disposed.

The ECU box comprises the box body molded of a resin, and the ECU contained in the box body. The ECU comprises an ECU body, and an outer casing made of aluminum. The outer casing has engagement portions corresponding respectively to retaining portions 26 formed on an inner surface of the lower cover 12. The engagement portions are engaged respectively with the retaining portions 26, thereby fixing the ECU to the lower cover 12.

The ECU body comprises an insulating board made of a resin, circuit members, and electrical parts, and electronic parts. A wiring board of a sandwich structure or a single-layer structure is used as the insulating board. Printed wiring conductors formed into a predetermined pattern, bus bars, wires and the like are used as the circuit members. The bus bar is formed by blanking a piece from an electrically-conductive sheet by the use of a pressing machine and then by bending it. The electronic parts, including semiconductor elements (such as ICs, transistors and diodes) and resistors, are mounted on the insulating board according to the need. Fuses, and relays and others are used as the electrical parts. The fuses and others do not always need to be contained in the ECU body, in which case the fuses can be collectively mounted in a fuse box, and this fuse box is provided at a suitable space within the engine room.

Many electronic parts, described above, are mounted at the ECU body, and therefore heat is liable to be produced in the ECU body, and in the case where a heat radiation performance of the ECU body is bad, there is a fear that a malfunction occurs. Therefore, in view of the heat radiation ability, the ECU body is contained in the outer casing made of aluminum having excellent thermal conductivity. However, the outer casing is not a box-like member completely closed at its four sides, and therefore there are fears that water, dust, dirt and others intrude into the ECU body and that the ECU body is broken upon interference with the exterior. In order to solve these problems, the ECU is received within the box body, and is protected by this box body. The problem that the ECU body is broken by an impact at the time of collision of the vehicle is the problem that the present invention seeks to solve, and this problem is solved by applying the construction of the invention to the ECU box.

The box body comprises the lower cover 12 having the upper opening, and an upper cover (not shown) for covering the upper opening in the lower cover 12. The upper cover is resin-molded into such a shape as to cover the upper opening in the lower cover 12, and when the upper cover is attached to the lower cover 12, a closed space is formed within the box body, and water, dust, dirt and others are prevented from intruding into the box body from the exterior, thereby protecting the ECU. Female screw portions for being threaded respectively on male screw portions 27 of the lower cover 12 are formed on the upper cover. The male screw portions 27 are threaded respectively into the female screw portions, thereby fixing the upper and lower covers to each other.

The lower cover 12 includes the front wall 13 and rear wall 15 opposed to each other in the forward-rearward direction X, the opposite side walls 28 and 34 opposed to each other in the right-left direction Y, and the bottom wall 23. The upper side of the lower cover 12 is open, and the ECU can be received within the lower cover 12. A wire harness (not shown) is led into the interior of the lower cover through a harness inlet port 32, and is electrically connected to the ECU, and is led out of the lower cover through a harness outlet port 20. A waterproof grommet is fitted in each of the harness inlet and outlet ports 32 and 20 so that water, moving along the wire harness, will not intrude into the lower cover.

The front wall 13 is disposed at the front side in the direction of advance of the vehicle, and is opposed to the headlamp 38a (shown in FIG. 6). When the automobile collides head-on with a vehicle, running in the opposite direction, or other, the front wall 13 is pressed against the front mask 38 having the headlamps 38a mounted thereon. The second mounting bracket 24 is formed at that portion of the bottom wall 23 disposed adjacent to the front wall 13 (FIGS. 1 and 2). An insertion hole 24a for the passage of a fastening bolt (fastening element) therethrough is formed through a bearing surface of the second mounting bracket 24 at a center thereof. The outer periphery of the insertion hole 24a is reinforced by radial ribs 24b. The second mounting bracket 24 is formed on the bottom wall 23, and therefore the lower cover 12 is fixed to the vehicle body panel or other before the ECU is received in the lower cover 12.

Figure 3:
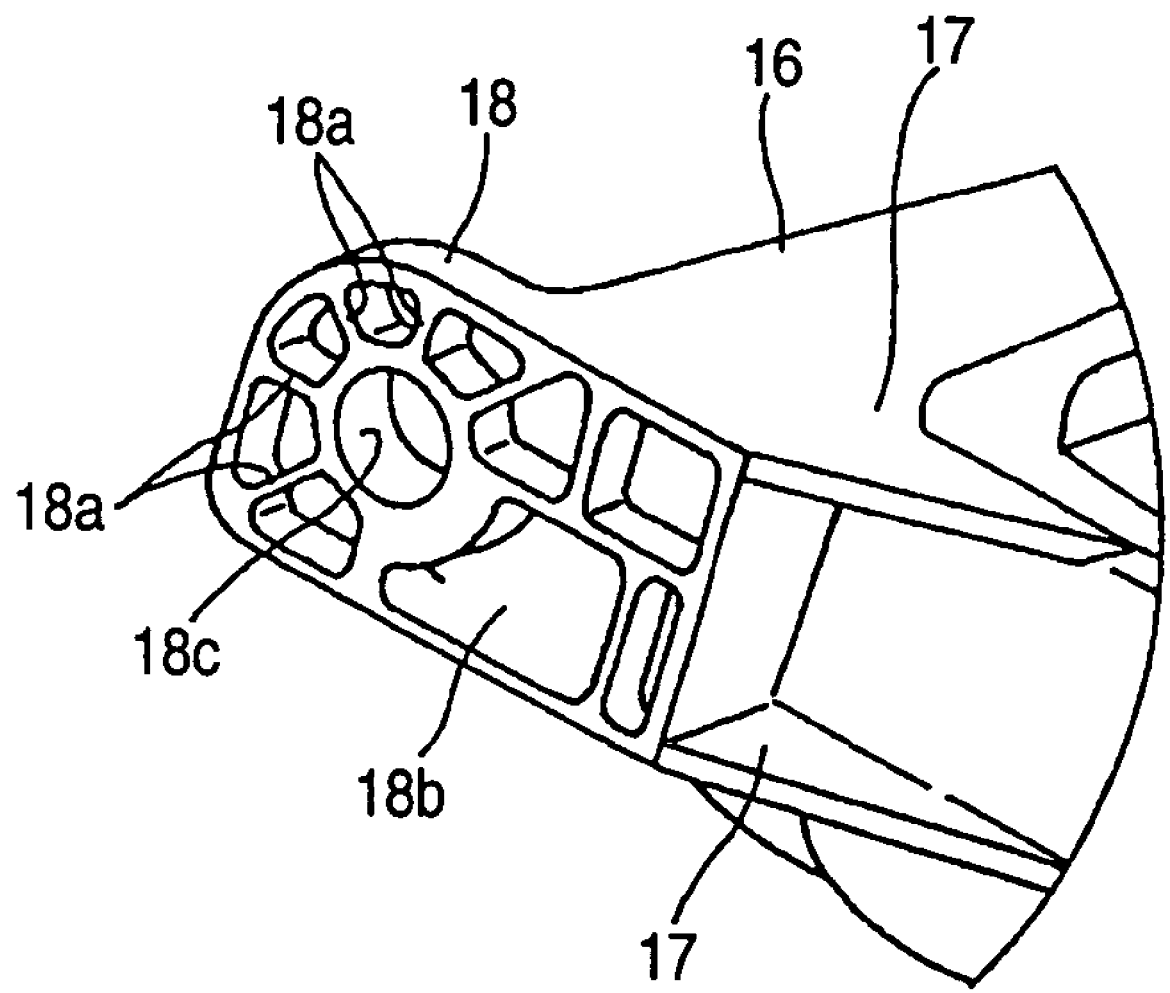
FIG. 3 is a perspective view showing a first mounting bracket of the lower cover on an enlarged scale.

The rear wall 15 is disposed at the rear side in the direction of advance of the vehicle, and is opposed to the suspension tower 42 (shown in FIG. 6), and this rear wall 15 strikes against the suspension tower 42 at the time of collision of the vehicle. The first mounting bracket 16 is provided at a lower portion of the rear wall 15, and projects in the direction of advance of the vehicle (FIGS. 1 to 3). There are occasions when the ECU box is located between the headlamp 38a and the battery 43 or other automotive part.

The first mounting bracket 16 includes interconnecting portions 17 continuous with the rear wall 15, and a tongue-like mounting portion 18 continuous with the interconnecting portions 17. As in the second mounting bracket 24, the insertion hole 18c for the passage of a fastening bolt therethrough is formed through a bearing surface of the mounting portion 18 at a center thereof. Radial ribs 18a are formed around the insertion hole 18c, and are spaced at different intervals in the circumferential direction. The distance between any two circumferentially-adjacent ones of those ribs 18a, disposed at the distal end portion of the mounting bracket 16, is smaller, while the distance between any two circumferentially-adjacent ones of those ribs 18a, disposed at the proximal end portion of the mounting bracket 16, is larger. The distal end portion (where the distance of the adjacent ribs 18a is smaller) is thus reinforced so that it will not be deformed even when the fastening bolt is tightened hard.

The hole portion (rupture induction portion) 18b (which is a weak portion) for inducing the rupture of the first mounting bracket 16 upon collision of the vehicle is formed through the proximal end portion of the first mounting bracket 16, and is formed between the ribs 18a provided at this proximal end portion. Assuming that the region where the first mounting bracket 16 is provided is divided into the two sections (regions) by the longitudinal axis P passing through the center of the insertion hole 18*c* of the first mounting bracket 16 and disposed parallel to the direction of advance of the vehicle, the hole portion 18*b* is disposed at one (section A) of the two sections which is disposed in the direction away from the direction B of laterally-inclining of the box body at the time of collision of the vehicle. Namely, assuming that the above region is divided into four sections (regions) by the longitudinal axis P and a transverse axis Q which perpendicularly intersect each other, the hole portion 18*b* is provided at the one section (region) A disposed at one corner portion of the proximal end portion of the first mounting bracket 16.

The region A is disposed at the proximal end portion of the first mounting bracket 16 at which this first mounting bracket 16 is connected to the box body, and therefore stresses are more liable to concentrate on this region A as compared with the other three regions separated by the longitudinal axis P and the transverse axis Q. And besides, when the region A is ruptured, the box body is laterally inclined, so that the box body can escape from the space between the headlamp 38*a* and the suspension tower 42.

When the front mask 38 of the automobile strikes against the front wall 13 at the time of collision of the vehicle, the box body is moved rearward, and an external force acts on the first mounting bracket 16, and a crack develops in that portion of the peripheral edge portion of the hole portion 18*b* (which originates a rupture) where the principal stress resides, and this crack grows in two directions toward the insertion hole and the outer wall, so that the region A of the mounting bracket 16 is ruptured in a notched condition. As a result, the fastening connection between the mounting bracket 16 and the fastening bolt is canceled, so that the box body moves in a direction away from the suspension tower 42 and generally perpendicular to the direction of advance of the vehicle.

Figure 4:
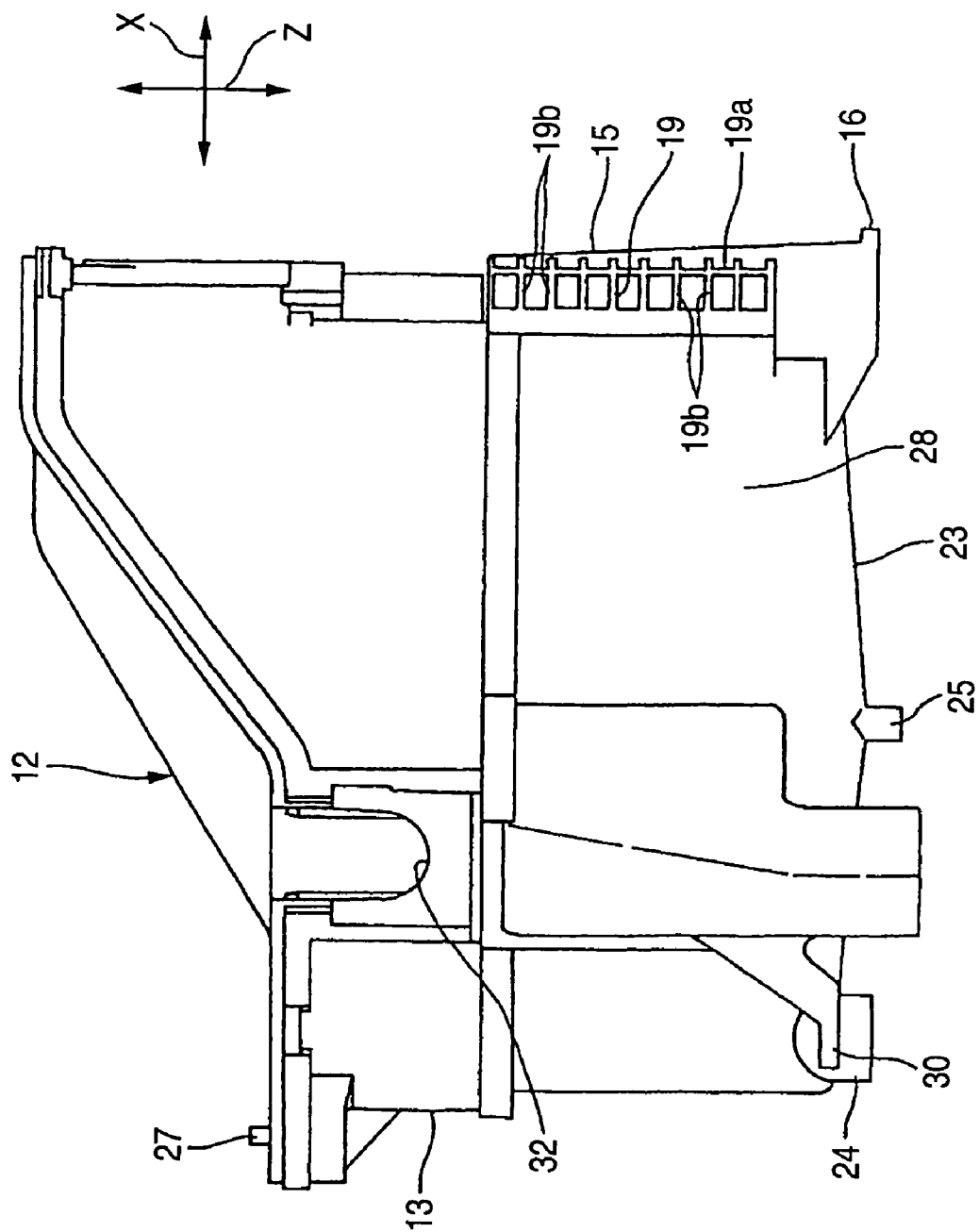
FIG. 4 is a side-elevational view of the lower cover.
Figure 5:
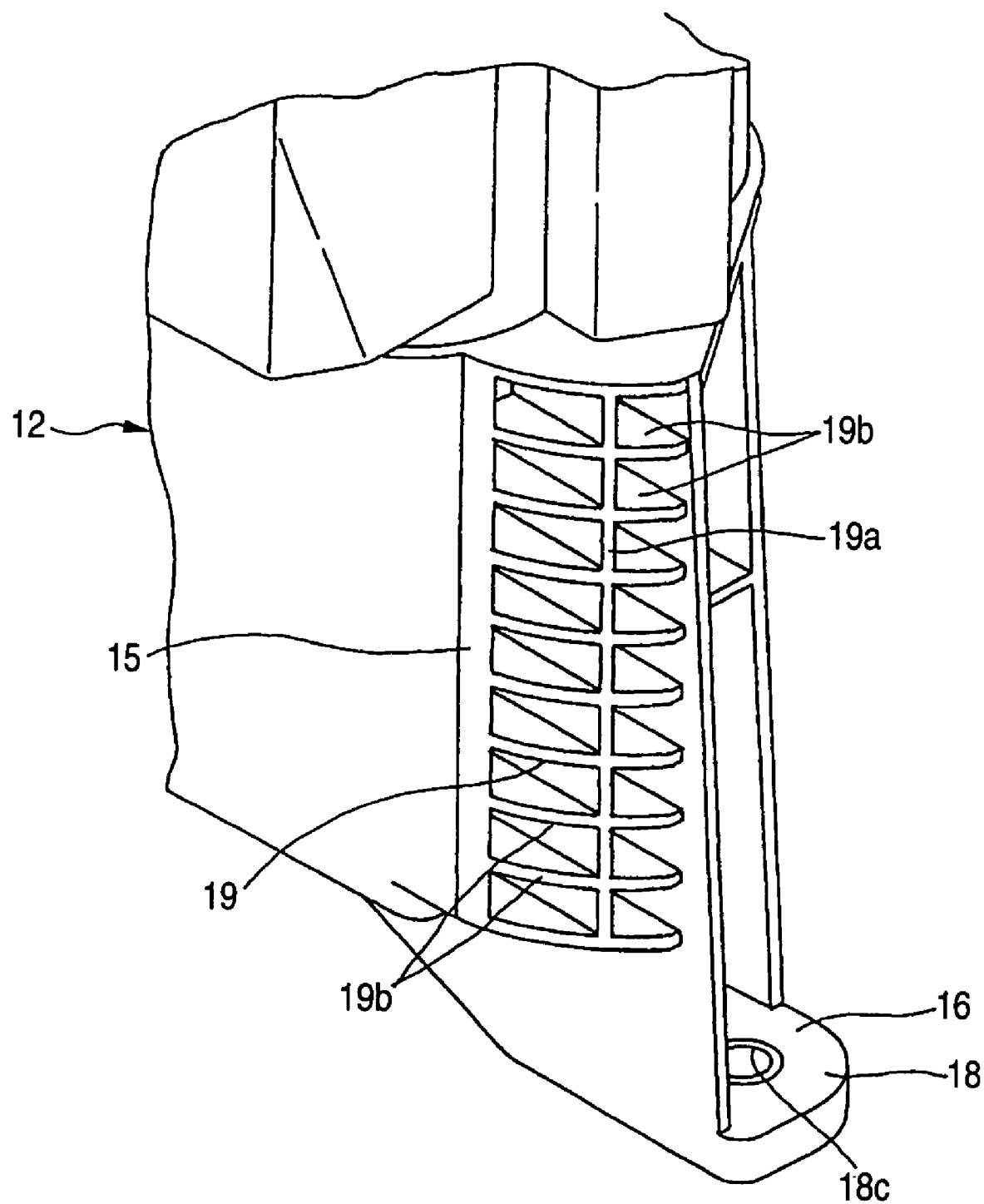
FIG. 5 is a perspective view showing an interference portion of the lower cover on an enlarged scale.

The interference portion 19 of a grid-like rib structure is formed on the rear wall 15, and is disposed above the first mounting bracket 16 (FIGS. 4 and 5). Within the engine room 37, the interference portion 19 is disposed forwardly of the distal end portion of the suspension tower 42 in adjacent relation thereto. When the box body is disengaged from the vehicle body panel by an impact upon collision of the vehicle, this interference portion 19 interferes with the distal end portion of the suspension tower 42. Distal ends of a plurality of ribs 19*b* are formed respectively into smooth convexly-curved surfaces projecting rearwardly, and therefore these convexly-curved surfaces interfere with the distal end portion of the suspension tower 42, and are moved in a streaming manner by an inertia force developing upon collision, so that the box body can escape in the direction away from the suspension tower 42.

Therefore, the ECU box is prevented from being held between the headlamp 38*a* and the suspension tower 42, and hence is prevented from being crushed together with the vehicle body panel. Thus, the ECU box is protected against damage, so that the function of the electrical system necessary for safety purposes can be maintained.

A vertical rib 19*a* and the horizontal ribs 19*b* intersect each other in a grid-like manner to form the interference portion 19. The interference portion is not limited to such a grid-like structure, but can take any other suitable form in so as a plurality of ribs intersect.

The opposite (left and right) side walls 28 and 34 face in the direction of the width of the automobile, and one side wall 28 is opposed to the fender apron 46, and is stepped, while the other side wall 34 is opposed to the engine 41, and is generally flat.

The third mounting bracket 30 (FIGS. 1 and 2) is formed at a lower portion of the one side wall 28, and projects in the direction of the width of the automobile, and the harness outlet port 32 is formed in an upper portion of the side wall 28.

The third mounting bracket 30 is an auxiliary mounting bracket for preventing the box body from shaking in the lateral direction. The slot 30*a* for the passage of a fastening bolt therethrough is formed through a bearing surface of the third mounting bracket 30 at a center thereof. The third mounting bracket 30 is similar to the first and second mounting brackets 16 and 24 in that the outer periphery of the slot 30*a* is reinforced by radial ribs 30*b*, but differs from the first and second mounting brackets 16 and 24 in that the hole for the passage of the fastening bolt therethrough is formed as the slot.

The long axis of the slot 30*a* extends along the straight line L interconnecting the center of the insertion hole 18*c* of the first mounting bracket 16 and the center of the slot 30*a* of the third mounting bracket 30. By forming this slot 30*a* whose long axis is in agreement with the direction of the straight line L, the box body is allowed to be displaced in the direction of the long axis of the slot 30*a* of the third mounting bracket 30, so that the first mounting bracket 16 can be easily inclined laterally. Therefore, the movement of the box body in the lateral direction is prevented by the third mounting bracket 30 during the travel of the vehicle, while the box body can escape from the space between the headlamp 38*a* and the suspension tower 42 at the time of collision of the vehicle.

The other side wall 34 is formed into a generally flat configuration, and at the time of collision of the vehicle, the box body can smoothly move without being caught by the battery 43 and the engine 41. An inlet port (not shown) is formed in the side wall 34, and a power cable, connected to the battery 43, is led into the box body through this inlet port.

The bottom wall 23 defines a slanting surface gradually slanting downwardly from longitudinal opposite ends thereof toward a central portion thereof. A drain hole 25 for discharging water (deposited on the inner surface of the box body because of dew condensation) is formed through the deepest portion of the bottom wall 23, and water, collected in the box body, is always discharged to the exterior.

As described above, in this embodiment, with respect to the automobile having the vehicle body of the high collision-safety type capable of absorbing an impact upon collision of the vehicle so as to protect the passengers in the passenger room, the hole portion 18*b* for being preferentially ruptured by an impact upon collision of the vehicle is provided at one (section A) of the two sections which is disposed in the direction away from the direction of laterally-inclining of the box body at the time of collision of the vehicle, assuming that the region where the first mounting bracket 16 is provided is divided into the two sections (regions) by the longitudinal axis P passing through the center of the insertion hole of the first mounting bracket 16 and disposed parallel to the direction of advance of the vehicle. Therefore, when the automobile collides head-on with a vehicle, running in the opposite direction, or other, an impact force, produced by the collision, acts on the hole portion 18*b* in a concentrating manner, thereby inducing the rupture of the hole portion 18*b*, so that the box body is separated from the vehicle body panel, and also escapes from the space between the headlamp 38*a* and the suspension tower 42 to move into the unoccupied space at the rear side of the engine 41. As a result, the crushing of the box body is prevented without adversely affecting the crushability performance of the automobile, thereby maintaining the function of the electric system necessary for safety purposes. When the interference portion 19 is provided at the rear wall 15 of the box body, the smooth convexly-curved surface of the interference portion 19 strikes against the distal end portion of the suspension tower 42, and moves in the direction away from the automotive part. In the invention, it is not of absolute necessity to provide both of the hole portion 18b and the interference portion 19. However, when both are provided as in this embodiment, there is achieved an advantage that the box body can be positively moved in the direction away from the automotive part because of the synergistic effect achieved by the hole portion 18b and interference portion 19.

The above embodiment can be modified without departing from the scope of the invention, and for example the following modifications can be made.

(1) The ECU box is fixedly mounted within the engine room 37 in such a slightly-inclined manner that the center of the insertion hole 18c of the first mounting bracket 16 and the center of the insertion hole 24a of the second mounting bracket 24 are offset relative to each other in the right-left direction Y. With this arrangement, the ECU box can be easily inclined laterally upon collision of the vehicle, so that the ECU box can positively escape from the space between the headlamp 38a and the suspension tower 42.

(2) Instead of the hole portion 18b, a notch can be formed in the rib 18a disposed at the proximal end portion of the first mounting bracket 16. In addition to the hole portion 18b, a notch can be formed in the mounting bracket 16 so that the rupture of the mounting bracket 16 can be easily induced. In the case where the rupture induction portion, comprising the hole portion 18b and the notch portion, is provided at the mounting bracket 16, the rupture of the mounting bracket 16 can be more easily induced, so that the mounting bracket 16 can be more positively ruptured upon collision of the vehicle.

(3) The interference portion 19 of the grid-like structure, having the intersecting vertical and horizontal ribs 19a and 19b, is modified into a thickened-wall structure. By doing so, the interference portion 19 is simplified in construction, and the moldability of the lower cover 12 is enhanced.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

What is claimed is:

1. An electric distribution box, comprising:
   a box body for being placed in a vehicle room;
   a mounting portion, which is provided on the box body for being fixed to a vehicle body, and having an insertion hole; and
   a rupture induction portion, which is provided at a box body side of the mounting portion for inducing the rupture of the mounting portion by an impact upon collision of a vehicle so as to separate the box body from the vehicle body,
   wherein the mounting portion is divided into two virtual sections by a longitudinal line passing through a center of the insertion hole of the mounting portion, the longitudinal line being substantially parallel to an advance direction of the vehicle; and
   wherein the rupture induction portion is arranged at one of the two virtual sections which is disposed on a side in a first direction for allowing the box body to move in a second direction perpendicular to the advance direction of the vehicle upon collision of the vehicle; and
   wherein the first direction is opposite to the second direction.

2. The electric distribution box as set forth in claim 1, wherein the rupture induction portion is a hole portion formed on the mounting portion.

3. The electric distribution box as set forth in claim 1, wherein the box body has a front wall, rear wall and a side wall regarding to the advance direction of the vehicle;
   wherein the mounting portion is provided at the rear wall;
   wherein an auxiliary mounting portion is provided at a front wall side of the side wall; and
   wherein an elongated hole for fixing purposes is formed on the auxiliary mounting portion so as to extend substantially along a line interconnecting the center of the mounting portion and a center of the auxiliary mounting portion.

4. The electric distribution box as set forth in claim 1, further comprising an interference portion, which is provided on the box body, and the interference portion having a convexly-curved surface for allowing the box body to escape in a direction away from an automotive part when the box body is disengaged from the vehicle body by an impact upon collision of a vehicle and interfered with the automotive part.

5. The electric distribution box as set forth in claim 4, wherein the interference portion includes ribs arranged in a mesh pattern.

* * * * *